July 19, 1927.
G. P. GEPHART
1,636,631
WELL DRILLING RIG
Filed Sept. 18, 1926
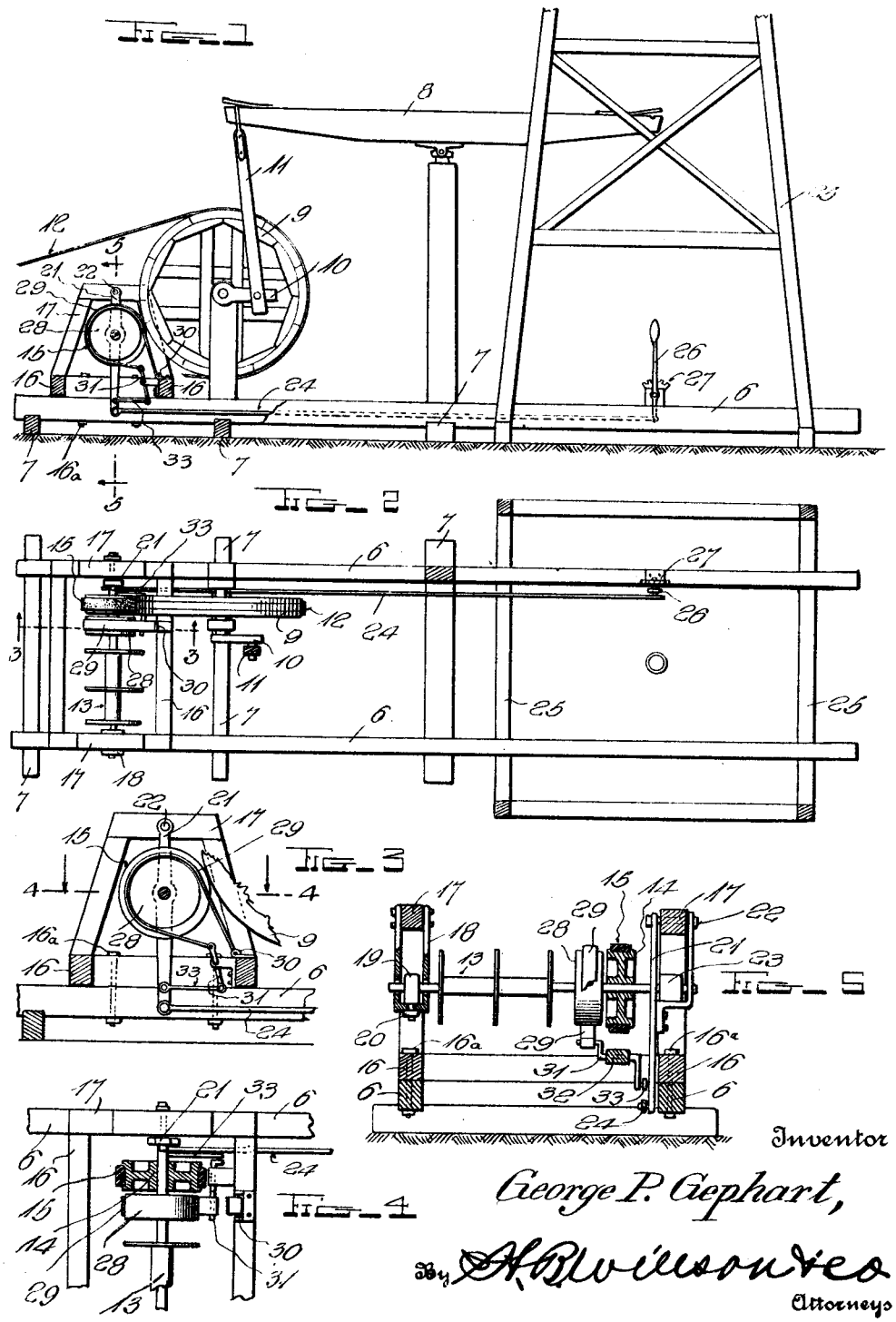
Inventor
George P. Gephart,
By H. B. Wilson &co
Attorneys Patented July 19, 1927.

1,636,631

UNITED STATES PATENT OFFICE.

GEORGE P. GEPHART, OF PEABODY, KANSAS.

WELL-DRILLING RIG.

Application filed September 18, 1926. Serial No. 136,330.

The invention relates to improvements in well drilling rigs of the type commonly used for drilling oil wells and embodying means for reciprocating a string of tools. Rigs of this type, embody a derrick bed frame upon which a walking beam and a band wheel for operating said beam, are mounted, and a sand reel is also mounted on the bed frame, for operating the usual bailer. The band wheel is driven by a belt passing around the same and the sand reel is provided with a driving wheel adapted to be held against said band wheel to be driven by the latter, a swing lever being provided for moving the sand reel to either hold said driving wheel in contact with or out of contact with the band wheel. Ordinarily, this band wheel is constructed from wood, and from continual rolling against the metal driving wheel of the sand reel, the periphery of said band wheel becomes badly worn, splintered or feathered. This not only tends to allow slippage between the band wheel and the driving wheel of the sand reel, but causes serious wear to the belt by which said band wheel is driven, and when elevating heavy loads with the bailer, the operator must hold the swing lever with great force in order to hold the driving wheel of the sand reel against the band wheel with sufficient friction to obtain any efficiency whatever from the reel, and often it is necessary that two men exert their entire strength on said swing lever in order to maintain the necessary amount of friction. Holding of the reel driving wheel against the band wheel with such force, necessarily injures the latter in short time, to such an extent that it must be replaced by a new wheel, and in the meantime, the band wheel has so injured the belt that a new belt is also necessary.

It is one object of my invention to provide a new and improved well drilling rig, in which the above enumerated difficulties are effectively overcome. To attain this end, I provide the reel driving wheel with a rubber tire for contact with the band wheel. In this connection, I may state that I know the mere idea of applying a rubber tire to a friction wheel for engagement with another friction wheel, is old, but it is my belief, after considering the advantages flowing from the application of such a tire to the particular wheel upon which I use it, that I have exercised inventive genius. By the use of this tire, no slippage takes place between the band wheel and the driving wheel of the sand reel, and the reel starts to rotate immediately upon bringing of the rubber tire into contact with the band wheel. Moreover, comparatively little force is required to hold the rubber tired wheel against the band wheel and the tire will effectively adapt itself to any irregularities which may exist on the periphery of the band wheel. Another important advantage for the rubber tire at the particular point where I make use of it, is that the wheel equipped with said tire is absolutely prevented from injuring the band wheel and consequently this band wheel cannot injure the belt. I thus attain an absolutely new result which does not flow from the mere use of a rubber tire upon a friction wheel, but flows from an unobvious application of a rubber tire to the sand reel driving wheel of a rig, so that the tire cooperates with the periphery of the belt-driven band wheel. In so far as I know the idea is new, of protecting the periphery of the belt-driven band wheel, by the use of a rubber tired reel-driving wheel, and thus protecting the driving belt of the band wheel by the use of said rubber tired wheel. Then too, the additional advantages above enumerated, are attained with the rubber tired wheel in question.

A great deal of time and trouble are necessary to set a sand reel upon the bed frame of a well drilling rig, when the conventional construction is employed for this purpose. It is another aim of my invention to provide a new and improved mounting means for the sand reel, of such nature that the reel may be set initially or later adjusted as occasion may demand, with the expenditure of an exceptionally little amount of time and trouble, the construction being such as to permit the use of a comparatively short swing lever which does not project upwardly and encumber the machine, as is the case with the swing levers now commonly used.

A still further object of the invention is to provide new and improved brake means operatively connected with the swing lever to contract a brake band about a brake drum on the sand reel, when said swing lever is moved to bring the reel driving wheel out of contact with the band wheel.

With the foregoing in view, the invention resides in the novel subject matter herein-after described and claimed, the description being supplemented by the accompanying drawings.

Fig. 1 is a side elevation partly in section, showing a well drilling rig improved in accordance with my invention.

Fig. 2 is a top plan view with the derrick in horizontal section.

Fig. 3 is an enlarged, vertical, longitudinal, sectional view on the plane of line 3—3 of Fig. 2.

Fig. 4 is a horizontal sectional view as indicated by line 4—4 of Fig. 3.

Fig. 5 is a vertical transverse section on line 5—5 of Fig. 1.

A derrick bed frame is shown, including parallel longitudinal beams or sills 6, connected at intervals by transverse ties 7. Mounted upon the bed frame, is the usual walking beam 8 and band wheel 9 for operating the same, through the instrumentality of the crank 10 and pitman 11. The band wheel 9 is driven by the usual belt 12 and while I have shown the wheel 9 constructed from wood, a metal wheel could be used if desired.

13 designates the usual sand reel and 14 has reference to a friction driving wheel therefor, adapted to be driven by means of the band wheel 9, but this wheel 14 is provided with a rubber tire 15 for contact with the periphery of the wheel 9, to attain the advantages hereinbefore enumerated.

The reel 13 is mounted in a novel manner. In the present showing, an auxiliary, rectangular bed frame 16 is secured by bolts 16ª upon the bed frame of the derrick, below the reel 13, and a pair of arched frames 17 rise rigidly from the ends of said auxiliary bed frame 16. A U-shaped hanger 18 is rigidly secured to and depends from the crown bar of one of the frames 17, and carries a bearing 19 for one end of the reel 13, said bearing being preferably connected with the hanger upon a vertical, pivotal axis 20, permitting slight horizontal swinging of the reel to bring the tire 15 into or out of contact with the band wheel 9. A swing lever 21 has its upper end fulcrumed at 22 to the crown bar of the other frame 17, said swing lever carrying a bearing 23 for the other end of the reel 13. If desired, the upper end of this swing lever 21 may be forked as seen in Fig. 5, and the bearing 23 may be secured in the crotch of the fork.

The lower end of the swing lever 21 is pivoted to a longitudinal rod 24 which extends to a point under the derrick 25, said rod being pivoted at said point to a hand lever 26. A dog and rack or other desired means 27, are employed to hold lever 26 in the position which it occupies when so holding the swing lever 21 as to retain the tire 15 in contact with the wheel 9. This lever may be conveniently and easily operated with little force, due to the fact that the rubber tire 15 does not require that the sand reel be forced so tightly toward the band wheel 9 in order to drive said reel.

A brake drum 28 is provided on the reel 13 and a brake band 29 surrounds said drum, one end of this band being secured at 30 to the frame 16, in the present disclosure, while the other end of said band is pivoted to a vertical lever 31. This lever is fulcrumed at 32 upon the frame 16 and by means of a link 33 or other desired connector, the lower end of said lever is connected with the lower end of the swing lever 21. By this arrangement, when the reel 13 is being driven, the brake band is expanded and released. When the swing lever is operated to bring the tire 15 out of driving contact with the wheel 9, the band remains expanded sufficiently to permit free rotation of the reel 13, to pay out the cable as the bailer is lowered. Upon further swinging of the lever 21 away from the wheel 9, the operating connections 33—32, contract the band 29 about the drum 28 with any desired degree of strength, so that the rotation of the reel 13 and the consequent lowering of the bailer are easily under control of the operator.

While the general construction herein disclosed is illustrative of one manner of producing an improved machine in accordance with my invention, it is to be understood that within the scope of such invention as claimed, variations may be made. Regardless of details, advantages hereinbefore set forth, which advantages have not previously been attained in the art to my knowledge, are accomplished.

I claim:—

1. In a well drilling rig, a sand reel having a driving wheel co-operable with the usual band wheel, means mounting said sand reel for movement toward and from the band wheel, including a swing lever, a brake drum on the sand reel, a brake band passing around said brake drum, and contracting means for said brake band connecting the latter with said swing lever, said contracting means being operable by said swing lever to apply the brake to any desired extent when said lever is moved to disengage the reel driving wheel from the band wheel.

2. In a well drilling rig, a base provided with transversely spaced upstanding frames, a sand reel between said upstanding frames provided with a driving wheel for engagement with the usual band wheel, means connected with said upstanding frames and mounting said sand reel in a manner permitting movement of its driving wheel toward and from the band wheel, said means including a swing lever fulcrumed at its upper end to one of said upstanding frames, means connected to the lower end of said swing lever for operating the same to effect engagement of the reel driving wheel with or disengagement from the band wheel, a brake drum on the sand reel, a brake band passing around said drum and anchored at one of its ends to said base, a lever fulcrumed on said base and connected to the other end of said band, and a connector connecting the last named lever with the swing lever, whereby movement of the latter to separate the above named wheels will effect contraction of said brake band.

3. In a well digging rig, a derrick bed frame, a band wheel mounted thereon for operating the usual walking beam, an auxiliary bed frame secured to the derrick bed frame, a pair of arched frames rising rigidly from said auxiliary bed frame, a U-shaped hanger rigidly secured to and depending from the crown bar of one of said arched frames, a bearing pivotally mounted in said hanger for horizontal turning therein, a swing lever having a forked upper end fulcrumed to the crown bar of said other frame, a bearing secured in said forked upper end of the lever, a sand reel having its shaft mounted in said bearings, a rubber tired driving wheel mounted on the shaft of said sand reel, means for operating said lever for bringing said driving wheel into and out of engagement with said band wheel, a brake drum mounted on the shaft of said sand reel, a brake band passing around said brake drum and contracting means for said brake band connecting the latter with said swing lever, said contracting means being operable by said swing lever to apply the brake to any desired extent when said lever is moved to disengage the reel driving wheel from the band wheel.

In testimony whereof I have hereunto affixed my signature.

GEORGE P. GEPHART.